US006673892B2

(12) United States Patent
Martinez et al.

(10) Patent No.: US 6,673,892 B2
(45) Date of Patent: Jan. 6, 2004

(54) PROCESS FOR REDUCING RESIDUAL FREE RADICAL POLYMERIZABLE MONOMER CONTENT OF POLYMERS

(75) Inventors: Jose Pedro Martinez, Kilgore, TX (US); Jeffrey James Vanderbilt, Longview, TX (US); Kenneth Alan Dooley, Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/134,940

(22) Filed: Apr. 29, 2002

(65) Prior Publication Data

US 2003/0204047 A1 Oct. 30, 2003

(51) Int. Cl.⁷ .................................................. C08F 6/00
(52) U.S. Cl. ........................... 528/480; 526/67; 526/71; 264/176.1
(58) Field of Search ..................... 526/67, 71; 528/480; 264/176.1

(56) References Cited

U.S. PATENT DOCUMENTS

| | | | |
|---|---|---|---|
| 2,334,195 A | 11/1943 | Hopff et al. | |
| 3,070,589 A | 12/1962 | Krich et al. | |
| 3,243,405 A | 3/1966 | Boyer et al. | |
| 4,021,400 A | 5/1977 | McKenna | |
| 4,139,697 A | 2/1979 | Sidi | |
| 4,182,851 A | 1/1980 | Straub et al. | |
| 4,460,750 A | 7/1984 | Thiersault et al. | |
| 4,503,219 A | 3/1985 | Reffert et al. | |
| 4,737,577 A | 4/1988 | Brown | |
| 5,194,582 A | 3/1993 | Eldridge et al. | |
| 5,292,660 A | 3/1994 | Overbeek et al. | |
| 5,852,147 A | 12/1998 | Yoo et al. | |
| 5,973,107 A | 10/1999 | Margotte et al. | |
| 6,096,858 A | 8/2000 | Dobbelaar et al. | |
| 6,127,435 A | 10/2000 | Robin et al. | |
| 6,218,331 B1 * | 4/2001 | DiMaio et al. | 502/109 |
| 6,310,163 B1 * | 10/2001 | Brookhart et al. | 526/318.6 |
| 6,359,077 B1 * | 3/2002 | Avgousti et al. | 525/333.8 |

FOREIGN PATENT DOCUMENTS

EP          0119771 A1       9/1984

OTHER PUBLICATIONS

Suwanda, D. and S.T. Balke, "The Reactive Modification of Polyethylene I:The Effect of Low Initiator Concentrations on Molecular Properties", *Polymer Engineering and Science*, 1993, 1585.

Yang, et al., "Efforts to Decrease Crosslinking Extent of Polyethylene in a Reactive Extrusion Grafting Process", *Journal of Applied Polymer Science* , 2001,vol. 79, 535–543.

* cited by examiner

*Primary Examiner*—Terressa M. Boykin
(74) *Attorney, Agent, or Firm*—Steven A. Owen; Bernie Graves

(57) ABSTRACT

There is disclosed a process for reducing residual free radical polymerizable monomer content of a polymer comprising contacting the polymer, in molten form, with a free radical initiator, such as di-tert-amylperoxide.

13 Claims, No Drawings

US 6,673,892 B2

PROCESS FOR REDUCING RESIDUAL FREE RADICAL POLYMERIZABLE MONOMER CONTENT OF POLYMERS

FIELD OF THE INVENTION

This invention relates to a process for reducing residual free radical polymerizable monomer content of a polymer.

BACKGROUND OF THE INVENTION

It is well known that many polymers may be produced by for example, the free radical polymerization process. In so doing, there may remain unreacted, or residual, monomer at the end of the polymerization process. The presence of the residual monomeric material may be undesirable for various reasons. For example, the residual monomer may be toxic, or may be characterized by an offensive odor. Accordingly, it is desirable to provide a process for the reduction or removal of residual free radical polymerizable monomers from polymers.

SUMMARY OF THE INVENTION

The process of the present invention for reducing the residual free radical polymerizable monomer content of a polymer is comprised as follows. A polymer having free radical polymerizable monomer content, in molten form, is contacted with a free radical initiator that is present in an amount ranging from about 25 to about 500 parts per million (ppm), based on the polymer.

DETAILED DESCRIPTION OF THE INVENTION

The process of the present invention for reducing the residual free radical polymerizable monomer content of a polymer is comprised as follows. A polymer having residual free radical polymerizable monomer content, in molten form, is contacted with a free radical initiator that is present in an amount ranging from about 25 to about 500 ppm, based on the polymer.

In more detail, the present process is suitable for use with any polymer, or interpolymer, having residual free radical polymerizable monomer content. Exemplary of monomers polymerizable by a free radical polymerization process include, but are not limited to, alpha-olefins; dienes such as butadiene and chloroprene; styrene, alpha-methyl styrene, and the like; heteroatom substituted alpha-olefins, for example, vinyl acetate, vinyl alkyl ethers for example, ethyl vinyl ether, vinyltrimethylsilane, vinyl chloride, tetrafluoroethylene, chlorotrifluoroethylene, N-(3-dimethylaminopropyl methacrylamide, dimethylaminopropyl methacrylamide, acrylamide, methacrylamide, and similar derivatives; acrylic acids and derivatives for example, acrylic acid, methacrylic acid, crotonic acid, acrylonitrile, acrylic esters substituted with methoxy, ethoxy, propoxy, butoxy, and similar derivatives for example, methyl acrylate, propyl acrylate, butyl acrylate, methyl methacrylate, methyl crotonate, glycidyl methacrylate, alkyl crotonates, and related esters; cyclic and polycyclic olefin compounds for example, cyclopentene, cyclohexene, cycloheptene, cyclooctene, and cyclic derivatives up to $C_{20}$; polycyclic derivates for example, norbornene, and similar derivatives up to $C_{20}$; cyclic vinyl ethers for example, 2,3-dihydrofuran, 3,4-dihydropyran, and similar derivatives; allylic alcohol derivatives for example, vinylethylene carbonate, disubstituted olefins such as maleic and fumaric compounds for example, maleic anhydride, diethylfumarate, and the like; and mixtures thereof.

Exemplary of the homopolymers or interpolymers having residual free radical polymerizable monomer content, include, but are not limited to, polyethylene, poly(ethylene-alkylcrotonates) for example, poly(ethylene-methyl crotonate), polystyrenes, poly(ethylene-methylacrylate), poly(ethylene-butylacrylate), poly(ethylene-vinyl alcohol derivatives) for example, poly(ethylene-vinylacetate), poly (ethylene-vinyl chloride), poly(ethylene-tetrafluoroethylene), poly(ethylene-norbornene), poly (ethylene-methylcrotonate), poly(ethylene-glycidyl methacrylate), poly(ethylene-methacrylamide), poly (ethylene-acrylonitrile), poly(ethylene-maleic anhydride), poly(ethylene-vinylethylene carbonate), and the like. In a preferred embodiment, the interpolymer utilized is SP2260 poly(ethylene-methylacrylate) having a methyl acrylate content of 24 weight %, and a melt index of 1.8 g/10 min., available from Eastman Chemical Company.

The free radical polymerization process is well known and involves a reaction initiated by the formation of a free radical from a free radical generator for example, a peroxide or azo initiator. A reaction is initiated by addition of the free radical to an unsaturated monomer molecule that subsequently adds, in a step-wise manner, to additional unsaturated monomers to form a growing chain, or polymer. Reaction parameters for example pressure (typical working pressures for low density polyethylene (LDPE) are in the range of 10,000–40,000 psi, or 1500–3000 atm) and temperature (typical working temperatures for LDPE are in the range of 200–300° C.) can be varied to affect the outcome of the product. (For further information see Kirk-Othmer Vol. 6, p. 383, "Encyclopedia of Chemical Technology").

In carrying out the present process, a polymer that has residual free radical polymerizable monomer content is heated to a temperature above the melting temperature of the polymer, in order to melt the polymer. If the polymer is already in the molten form, it is maintained at a temperature above the melting temperature of the polymer in order to keep the polymer molten. Thereafter the polymer, in molten form, is contacted with a free radical initiator, that is present in an amount ranging from about 25 to about 500 parts per million (ppm), based on the polymer. As a result of the process, the residual free radical polymerizable monomer content of the polymer is reduced. In a preferred embodiment, the process is carried out in the presence of an amount of free radical initiator ranging from about 50 to 300 ppm, based on the polymer, and in a more preferred embodiment, in the presence of an amount of from about 90 to about 150 ppm of free radical initiator.

Any free radical initiator may be used in carrying out the process of the present invention. A free radical initiator is a chemical substance that initiates chemical reactions by producing free radicals. For further information, reference is made to Kirk Othmer's "Encyclopedia of Chemical Technology," Vol. 14, p. 431. Examples of suitable free radical initiators include, but are not limited to, the following:

1. Organic Peroxides (Require initiation by heat):
    a. t-alkyl peroxyesters
        tert-butyl peroxybenzoate
        tert-butyl peroxyacetate
        tert-butyl peroxypivalate
        tert-butyl peroxymaleate
    b. monoperoxycarbonates
        OO-tert-butyl O-isopropyl monoperoxycarbonate
    c. diperoxyketals
        ethyl 3,3-di-(tert-amylperoxy)-butyrate
        n-butyl 4,4-di(tertbutylperoxy)-valerate
        1,1-di(tert-butylperoxy)-cyclohexane
        1,1-di(tert-amylperoxy)-cyclohexane
    d. dialkyl peroxides
        2,5-di(tert-butylperoxy)-2,5-dimethyl-3-hexyne
        2,5-di(tert-butylperoxy)-2,5-dimethylhexane di-tert-amyl peroxide
di-tert-butyl peroxide
dicumyl peroxide
e. t-alkyl hydroperoxides
  tert-butyl hydroperoxide
  tert-amyl hydroperoxide
  alpha-cumyl hydroperoxide
f. ketone peroxides
  methyl ethyl ketone peroxide
  cyclohexanone peroxide
  2,4-pentanedione peroxide
g. Also (From G. Luft and H. Bitsch in J. Macromol. Sci.-Chem., 1977, A11(6), 1089.)
  isobutyryl peroxide
  isopropyl peroxydicarbonate
  di-n-butyl peroxydicarbonate
  di-sec-butyl peroxydicarbonate
  tert-butyl perneodecanoate
  dioctanoyl peroxide
  didecanoyl peroxide
  diproprionyl peroxide
  didecanoyl peroxide
  dipropionyl peroxide
  dilauroyl peroxide
  tert-butyl perisobutyrate
  tert-butyl peracetate
  tert-butyl per-3,5,5-trimethyl hexanoate
2. Azo Compounds (Require initiation by heat):
  2,2'-azobis[4-methoxy-2,4-dimethyl] pentanenitrile
  2,3'-azobis[2,4-dimethyl] pentanenitrile
  2,2'-azobis[isobutyronitrile]
3. Carbon-Carbon Initiators (Require initiation by heat):
  2,3-dimethyl-2,3-diphenylbutane
  3,4-dimethyl-3,4-diphenylhexane
  1,1,2,2-tetraphenyl-1,2-bis(trimethylsiloxy)ethane
4. Inorganic Peroxides (Require initiation by heat):
  hydrogen peroxide
  potassium peroxydisulfate
5. Photoinitiators (Require initiation by light):
  benzophenone
  4-phenylbenzophenone
  xanthone
  thioxanthone
  2-chlorothioxanthone
  4,4'-bis(N,N'-dimethylamino benzophenone) (Michler's ketone)
  benzil
  9,10-phenanthraquinone
  9,10-anthraquinone
  alpha,alpha-dimethyl-alpha-hydroxyacetophenone
  (1-hydroxycyclohexyl)-phenylmethanone
  benzoin ethers
    methyl
    ethyl
    isobutyl
  alpha,alpha-dimethoxy-alpha-phenylacetophenone
  1-phenyl-1,2-propanedione,2-(O-benzoyl)oxime
  diphenyl(2,4,6-trimethylbenzoyl)phosphineoxide
  alpha-dimethylamino-alpha-ethyl-alpha-benzyl-3,5-dimethyl4-morpholinoacetophenone In a preferred embodiment, there is used as the free radical initiator, di-tert-amyl peroxide.

The period of time during which the contacting of the polymer with the free radical initiator occurs, to reduce the residual free radical polymerizable monomer content of the polymer, may be any period of time that is required for the reduction of residual free radical polymerizable monomer content to be achieved. It is preferred, however, for the contacting of the polymer with the free radical initiator to be completed within a period of time of up to about 10 minutes, preferably from about 5 seconds to about 10 minutes. In this manner, degradation of the polymer can be avoided.

The present process may be carried out in any suitable apparatus. For example, the process may preferably be carried out using the well known reactive extrusion technique. This technique involves subjecting the polymer to heat, to melt the polymer, in an extruder, and to mix the molten polymer with the free radical initiator. Preferably, a twin-screw extruder is used as the extruder.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the properties of the polymers herein.

| | |
|---|---|
| Melt Index | ASTM Test Method D-1238 |
| Melt Index Ratio | ASTM Test Method D-1238 |
| Residual Free Radical | Headspace Procedure |
| Polymerizable Monomer Content | Defined as follows. |

This section summarizes the procedure for the determination of residual comonomer (CM) in copolymers by analysis of the sample headspace using Selected-Ion Monitoring (SIM) Gas Chromatography/Mass Spectrometry (GC/MS). The volatiles from the headspace of each sample were concentrated for introduction into a GC using solid phase microextraction (SPME). SPME was performed using a manual fiber holder containing a 75 micrometers Carboxen/Polydimethylsiloxane fiber (Supelco Chromatography Products). Approximately 10 g of polymer pellets was accurately weighed and sealed in a 40 mL vial fitted with a septum cap. The pellets were equilibrated at 60° C. for 24 hours after which the fiber was exposed to the vial's headspace for 60 minutes at 60° C. The samples were analyzed by GC/MS using equipment described below with the inlet operated in the splitless mode for 0.3 min. during injection. A Hewlett-Packard (HP) 5890 Series II Gas Chromatograph with a HP 5989 mass selective detector was used for data collection. The separation was accomplished on a DB-5 ms (J&W) column (30 m×0.25 mm inner diameter (i.d.), 1.0 micrometer film thickness) using the following oven profile: 30° C. (2 min. hold)→160° C. (no hold) @ 10° C./min. The mass selective detector was operated at 70 eV using electron impact ionization and scanned in the SIM mode for the ions of 27, 42, 55 and 85 amu. A dwell time of 100 milliseconds was used for each mass that translated to 2.13 acquisition cycles per second.

The concentration of residual CM in the sample headspace was calculated using the integrated CM peak area from the extracted ion chromatogram for m/z 55 and a response factor determined from gas standards of known concentrations of CM in nitrogen. The standards ranged in concentration from 0 to 9.6 nanograms CM per mL of nitrogen. From the weight of the pellets and the density of the polymer, the volume of headspace in each vial, $V_{HS}$, was calculated that provided the total amount of CM in the headspace as the product of $[CM]_{HS}$ and $V_{HS}$. The assumption was made that substantially the entire CM originally present in the pellets was driven into the headspace upon extended heating at 60° C. Thus, the concentration of CM in the polymer was determined by dividing the total amount of CM by the weight of polymer sample.

Examples 1–3

In the Examples 1–3, the process was carried out under identical conditions, except for the amount of the polymer and di-tert-amylperoxide that was added as the free radical initiator. More particularly, a Berstorff ZE-25, 33 UD (length/diameter) twin screw extruder, with all zones equilibrated to a temperature of about 175° C., was used in carrying out the process. After a period of about 45 minutes of equilibration, there was introduced SP2260 ethylene-methyl acrylate interpolymer having a methyl acrylate content of 24 weight %, and a melt index of 1.8 g/10 min., available from Eastman Chemical Company, at varying rates. Also introduced was the di-tert-amylperoxide free radical initiator (dissolved in petroleum ether), at a rate to assure that the polymer would contact sufficient free radical initiator to achieve a reduction of the residual free radical polymerizable monomer content of the polymer. The SP2260 interpolymer, prior to contacting the free radical initiator, had a content of residual methyl acrylate in excess of 100 ppm. In each of Examples 1–3, by calculating the time required for a colored pellet to pass through the extruder, it was determined that the residence time for the contacting of the polymer with the free radical initiator was in the range of about 25 to 30 seconds. The strands of polymer obtained from the extruder were cooled in a water trough, and then cut into small pellets. The properties of the resultant polymer pellets are reported in Table 1.

Example 1

The SP2260 interpolymer was introduced at a rate of about 6 lb/hr, and the di-tert-amylperoxide was introduced at a rate such that the polymer was contacted with about 150 ppm of the di-tert-amylperoxide.

Example 2

The SP2260 interpolymer was introduced at a rate of about 8 lb/hr, and the di-tert-amylperoxide was introduced at a rate such that the polymer was contacted with about 112 ppm of the di-tert-amylperoxide.

Example 3

The SP2260 interpolymer was introduced at a rate of about 10 lb/hr, and the di-tert-amylperoxide was introduced at a rate such that the polymer was contacted with about 90 ppm of the di-tert-amylperoxide.

As mentioned, the results obtained from carrying out Examples 1–3, are reported in Table 1.

TABLE 1

Physical Properties of Polymers

| Example No. | Melt Index (g/10 min.) | Melt Index Ratio | Residual Free Radical Polymerizable Monomer Content |
|---|---|---|---|
| Comparative SP2260 Polymer | 1.8 | 51.1 | >100 ppm[1] |
| 1 | 2.0 | 58.6 | 4–5 ppb[2] |
| 2 | 2.2 | 58.6 | 4–5 ppb[2] |
| 3 | 2.3 | 59.1 | 4–5 ppb[2] |

[1]ppm = parts per million
[2]ppb = parts per billion

From the data in Table 1, it is observed that the present process achieves a significant reduction of the residual free radical polymerizable monomer content of a polymer. As another useful feature, the present process does not substantially alter other physical properties of the polymers.

It should be understood that the forms of the invention herein described are illustrative only and are not intended to limit the scope of the invention. The present invention includes all modifications falling within the scope of the following claims.

We claim:

1. A process for reducing residual free radical polymerizable monomer content of a polymer comprising contacting the polymer, in molten form, with a free radical initiator, present in an amount ranging from about 25 to about 500 parts per million, based on the polymer.

2. The process according to claim 1 wherein the free radical initiator is present in an amount ranging from about 50 to about 300 parts per million.

3. The process according to claim 2 wherein the free radical initiator is present in an amount ranging from about 90 to about 150 parts per million.

4. The process according to claim 1 wherein the free radical initiator is selected from the group consisting of an organic peroxide, an azo compound, a carbon-carbon initiator, an inorganic peroxide, and a photoinitiator.

5. The process according to claim 4 wherein the free radical initiator is an organic peroxide.

6. The process according to claim 5 wherein the free radical initiator is di-tert-amylperoxide.

7. The process according to claim 1 wherein the molten polymer is contacted with the free radical initiator for a period of time of up to about 10 minutes.

8. The process according to claim 1 wherein the polymer is an ethylene-methyl acrylate interpolymer.

9. The process according to claim 1 wherein the process for reducing residual free radical polymerizable monomer content is carried out in an extruder.

10. The process according to claim 9, wherein the extruder is a twin-screw extruder.

11. The process according to claim 10, wherein the polymer is an ethylene-methyl acrylate interpolymer, the molten polymer is contacted with the free radical initiator for a period of up to about 10 minutes, and the free radical initiator is di-tert-amylperoxide, present in an amount ranging from about 90 to about 150 parts per million, based on the polymer.

12. The process according to claim 1 wherein the molten polymer is contacted with the free radical initiator for a period of time ranging from about 5 seconds to up to about 10 minutes.

13. The process according to claim 11 wherein the molten polymer is contacted with the di-tert-amylperoxide for a period of time ranging from about 5 seconds to up to about 10 minutes.

* * * * *